(12) United States Patent
Li

(10) Patent No.: US 12,153,303 B2
(45) Date of Patent: Nov. 26, 2024

(54) DISPLAY MODULE AND PREPARATION METHOD

(71) Applicants: Beijing BOE Technology Development Co., Ltd., Beijing (CN); BOE Technology Group Co., Ltd., Beijing (CN)

(72) Inventor: Wenbo Li, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/026,233

(22) PCT Filed: Jun. 30, 2022

(86) PCT No.: PCT/CN2022/102849
§ 371 (c)(1),
(2) Date: Mar. 14, 2023

(87) PCT Pub. No.: WO2024/000416
PCT Pub. Date: Jan. 4, 2024

(65) Prior Publication Data
US 2024/0302689 A1 Sep. 12, 2024

(51) Int. Cl.
*G02F 1/1335* (2006.01)
*G02F 1/13363* (2006.01)
(Continued)

(52) U.S. Cl.
CPC .. *G02F 1/133502* (2013.01); *G02F 1/133541* (2021.01); *G02F 1/133638* (2021.01); *G02F 1/133788* (2013.01); *G02F 1/13718* (2013.01)

(58) Field of Classification Search
CPC .. G02F 1/133308; G02F 1/13363; G02F 1/31; G02F 1/133528; G02F 1/137;
(Continued)

(56) References Cited

U.S. PATENT DOCUMENTS

| 2016/0221507 A1* | 8/2016 | Takada | G02F 1/31 |
| 2018/0143363 A1* | 5/2018 | Ichihashi | G02B 5/26 |

(Continued)

FOREIGN PATENT DOCUMENTS

| CN | 111439204 B * | 1/2022 | B60R 1/087 |
| CN | 114103808 A * | 3/2022 | B60R 1/083 |

(Continued)

*Primary Examiner* — Hoan C Nguyen
(74) *Attorney, Agent, or Firm* — WHDA, LLP

(57) ABSTRACT

The anti-dazzle component included in the display module includes an anti-dazzle module, a selective reflecting sheet and a first phase-difference film; the selective reflecting sheet is overlaid on a first surface of the display component, and the first phase-difference film is arranged between the anti-dazzle module and the selective reflecting sheet, the anti-dazzle module is configured to pass through a first polarized light or a second polarized light, a polarization vector of the first polarized light is located in a plane formed by an incident light and a corresponding reflected light, and a polarization vector of the second polarized light is perpendicular to the plane; and a polarization direction of a light reflected by the selective reflecting sheet is the same as that of a light passing through the first phase-difference film, and is opposite to that of a light passing through the selective reflecting sheet.

14 Claims, 11 Drawing Sheets

(51) Int. Cl.
*G02F 1/1337* (2006.01)
*G02F 1/137* (2006.01)

(58) Field of Classification Search
CPC ............... G02F 1/1347; G02F 1/13471; G02F 1/133365; G02F 1/133536; H04N 5/65; G02B 27/144; G02B 5/30; B60R 1/088; B60R 1/04; B60R 1/083; B60R 1/12
See application file for complete search history.

(56) References Cited

U.S. PATENT DOCUMENTS

| | | | |
|---|---|---|---|
| 2020/0017029 A1 | 1/2020 | Taguchi et al. | |
| 2021/0157202 A1* | 5/2021 | Kumeta | G02F 1/1347 |
| 2021/0309152 A1* | 10/2021 | Li | G02F 1/133531 |

FOREIGN PATENT DOCUMENTS

| | | | |
|---|---|---|---|
| JP | 2000-321565 A | | 11/2000 |
| JP | 2001083501 A | * | 3/2001 |
| JP | 2004-144934 A | | 5/2004 |

* cited by examiner

DISPLAY MODULE AND PREPARATION METHOD

CROSS-REFERENCE TO RELATED APPLICATION

The present disclosure is a National Stage of International Application No. PCT/CN2022/102849, filed on Jun. 30, 2022, with the title of "DISPLAY MODULE AND PREPARATION METHOD", which is incorporated herein in its entirety by reference.

FIELD

The present disclosure relates to the technical field of display devices, in particular to a display module and a preparation method thereof.

BACKGROUND

With continuous development of display modules, performance of display modules is becoming more and more perfect. In order to improve visual experience of the display modules, anti-dazzle components are usually added to the display modules. The anti-dazzle components may realize selective polarization of light by setting semi-transparent and semi-reflective materials between anti-dazzle modules and the display components.

SUMMARY

Embodiments of the present disclosure provide a display module and a preparation method thereof, to solve a problem of high production and manufacturing costs of anti-dazzle components of display modules in related technology.

In order to solve the above technical problem, the present disclosure is implemented as follows:

In a first aspect, an embodiment of the present disclosure provides a display module, including: a display component and an anti-dazzle component,
wherein the anti-dazzle component includes: an anti-dazzle module, a selective reflecting sheet and a first phase-difference film;
the selective reflecting sheet is overlaid on a first surface of the display component, and the first phase-difference film is arranged between the anti-dazzle module and the selective reflecting sheet, wherein a first light-filtering sheet is overlaid on the first surface of the display component, the first light-filtering sheet is configured to convert a light emitted by the display component into a linearly-polarized light, the anti-dazzle module is configured to pass through a first polarized light or a second polarized light, a polarization vector of the first polarized light is located in a plane formed by an incident light and a corresponding reflected light thereof, and a polarization vector of the second polarized light is perpendicular to a plane formed by an incident light and a corresponding reflected light thereof; and
a polarization direction of a light reflected by the selective reflecting sheet is the same as that of a light passing through the first phase-difference film, and a polarization direction of a light reflected by the selective reflecting sheet is opposite to that of a light passing through the selective reflecting sheet.

Optionally, a second phase-difference film is further arranged between the selective reflecting sheet and the first surface of the display component, and the second phase-difference film is configured to convert a light into a circularly-polarized light.

Optionally, the light passing through the selective reflecting sheet is a right-handed circularly-polarized light, and the light reflected by the selective reflecting sheet is a left-handed circularly-polarized light.

Optionally, the light passing through the selective reflecting sheet is a left-handed circularly-polarized light, and the light reflected by the selective reflecting sheet is a right-banded circularly-polarized light.

Optionally, the anti-dazzle module includes a first transparent substrate, a second transparent substrate and a liquid-crystal cell, and
the liquid-crystal cell is arranged between the first transparent substrate and the second transparent substrate, and the first phase-difference film is overlaid under the second transparent substrate.

Optionally, the display module further includes a second optical light-filtering sheet, and
the second light-filtering sheet is overlaid on the first transparent substrate, and is configured to convert an ambient light into a linearly-polarized light.

Optionally, in a condition that an electric field is formed between the first transparent substrate and the second transparent substrate, liquid-crystal molecules in the liquid-crystal cell are arranged in a second direction, and the linearly-polarized light transmitted from the second light-filtering sheet passes through the liquid-crystal cell, to form the second polarized light, in a condition that no electric field presents between the first transparent substrate and
the second transparent substrate, the liquid-crystal molecules in the liquid-crystal cell are arranged in a first direction, and the linearly-polarized light transmitted from the second light-filtering sheet passes through the liquid-crystal cell, to form the first polarized light, and
an electric-field direction of the electric field is from the first transparent substrate to the second transparent substrate, the second direction is the same as the electric-field direction of the electric field, and the second direction and the first direction are perpendicular to each other.

Optionally, the selective reflecting sheet includes a liquid crystal layer and a polyester resin substrate,
a first surface of the liquid-crystal layer is overlaid on the polyester resin substrate, and a second surface of the liquid-crystal layer contacts the first phase-difference film, and
liquid-crystal molecules in the liquid crystal layer are a cholesteric liquid crystal, the liquid-crystal molecules are arranged in parallel in the liquid crystal layer, and corresponding liquid-crystal molecules of two adjacent layers are arranged in a helical rotation along a direction, wherein the direction is a normal direction of a plane at which the liquid-crystal layer is located.

Optionally, the first phase-difference film is a quarter-wave plate.

In a second aspect, an embodiment of the present disclosure provides a preparation method for preparing the selective reflecting sheet and the first phase-difference film included in the display module according to any embodiment in the first aspect, wherein the preparation method includes:
obtaining a substrate, wherein the substrate is a release substrate;
coating a photoalignment agent on the substrate, to form an alignment layer;

coating a polymerizable nematic liquid crystal on the alignment layer, to form the first phase-difference film;

preparing the selective reflecting sheet; and overlaying the first phase-difference film on a first surface of the selective reflecting sheet.

Optionally, the display module further includes a second phase-difference film, configured to convert a light into a circularly-polarized light, and, after the overlaying the first phase-difference film on the first surface of the selective reflecting sheet, the method further includes:

overlaying the second phase-difference film under a second surface of the selective reflecting sheet, wherein the first surface and the first surface are two opposite surfaces of the selective reflecting sheet.

Optionally, the preparing the selective reflecting sheet includes:

obtaining a polyester resin substrate;

blade-coating a liquid-crystal-mixed liquid on the polyester resin substrate at least twice;

drying the polyester resin substrate coated with the liquid-crystal-mixed liquid, to evaporate a solvent in the liquid-crystal-mixed liquid, so as to form a first liquid-crystal film layer on the polyester resin substrate;

placing the polyester resin substrate formed with the first liquid-crystal film layer under an ultraviolet-light lamp for radiation crosslinking, to perform ultraviolet-light curing on the first liquid-crystal film layer, so as to form a second liquid crystal film layer on the polyester resin substrate;

determining whether the second liquid-crystal film layer meets a full-band coverage of the display component, and in response to that the second liquid-crystal film layer does not meet the full-band coverage of the display component, continuing blade-coating the liquid-crystal-mixed liquid on the formed second liquid-crystal film layer, to form the first liquid-crystal film layer, and to further form a subsequent second liquid-crystal film layer, until a finally-formed second liquid-crystal film layer meets the full-band coverage of the display component, wherein a finally-formed selective reflecting sheet is a sum of a plurality of the second liquid-crystal film layers.

Optionally, the solvent in the liquid-crystal-mixed liquid is a cyclopentanone solvent.

Optionally, the drying the polyester resin substrate coated with the liquid crystal-mixed liquid, includes:

leaving the polyester resin substrate coated with the liquid-crystal-mixed liquid to stand still, so as to make the liquid-crystal-mixed liquid coated on the polyester resin substrate be in a flat state, and drying the liquid crystal-mixed liquid in the flat state.

BRIEF DESCRIPTION OF THE DRAWINGS

In order to more clearly illustrate technical solutions in embodiments of the disclosure or in related technology, the followings will briefly introduce drawings needed to be used in illustrating the embodiments or the related technology. Apparently, the drawings in the following description are only some embodiments of the disclosure. For those ordinary skilled in the field, they may further obtain other drawings according to the provided drawings without paying creative labor.

REFERENCE SIGNS

1: display component; 2: anti-dazzle component; 3: second light-filtering sheet; 11: first light-filtering sheet; 21: anti-dazzle module; 22: selective reflecting sheet; 23: first phase-difference film; 24: second phase-difference film; 211: first polarized light; 212: second polarized light; 213: first transparent substrate; 214: second transparent substrate; 215: LCD box; 221: liquid-crystal layer; 222: polyester resin substrate; 223: first substrate; 224: second substrate; 2211 liquid-crystal molecules.

DETAILED DESCRIPTION OF THE EMBODIMENTS

The followings will describe the technical solutions in the embodiments of the application clearly and completely in combination with the drawings in the embodiments of the application. Apparently, the described embodiments are a part of the embodiments of the application, not all of the embodiments of the application. Based on the embodiments in the application, all other embodiments obtained by the ordinary skilled in the art without doing creative work belong to the scope of protection in the application.

It should be understood that terms "one embodiment" or "an embodiment" mentioned throughout the specification mean that specific features, structures or characteristics related to the embodiment are included in at least one embodiment of the present disclosure. Therefore, terms "in one embodiment" or "in an embodiment" appearing throughout the entire specification may not necessarily refer to the same embodiment. In addition, these specific features, structures or characteristics may be combined in one or more embodiments in any appropriate manner.

Because the semi-transparent and semi-reflective materials need to adopt structures formed by stacking a plurality of layer films, production and manufacturing processes thereof are relatively complex, which increases production and manufacturing costs thereof, thus increasing production and manufacturing costs of the anti-dazzle components of the display modules.

Figure 1:
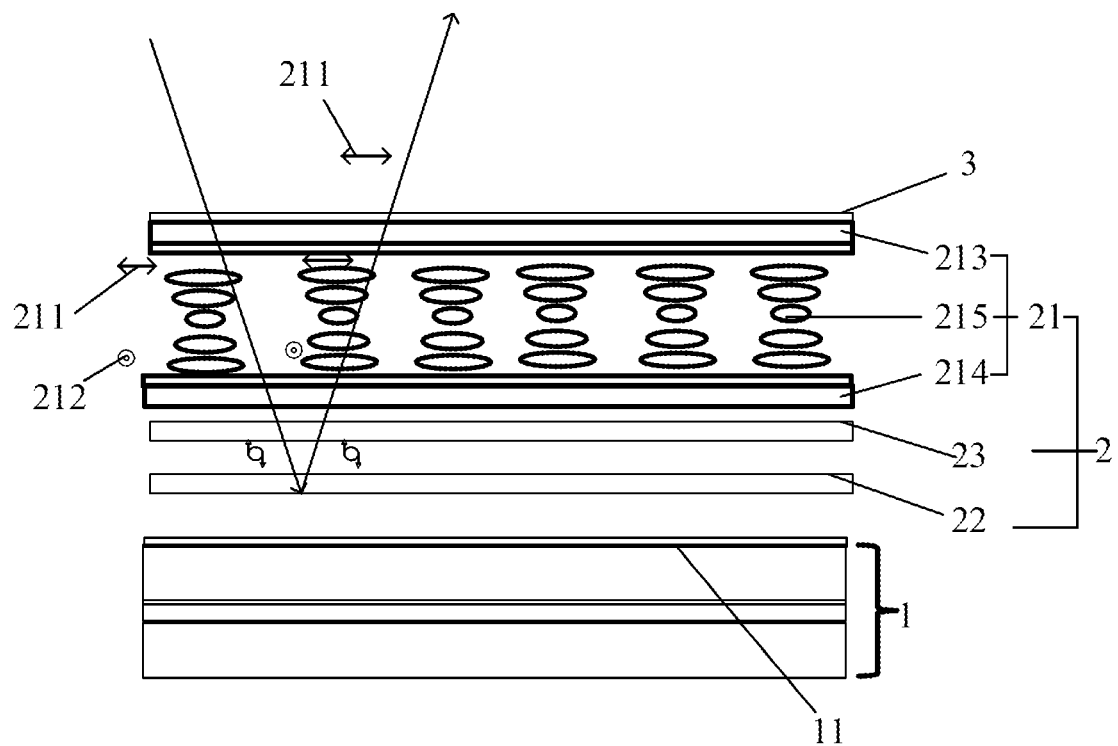
FIG. 1 is a schematic view showing a light path in a first kind of display module provided by an embodiment of the present disclosure in a first state.
Figure 2:
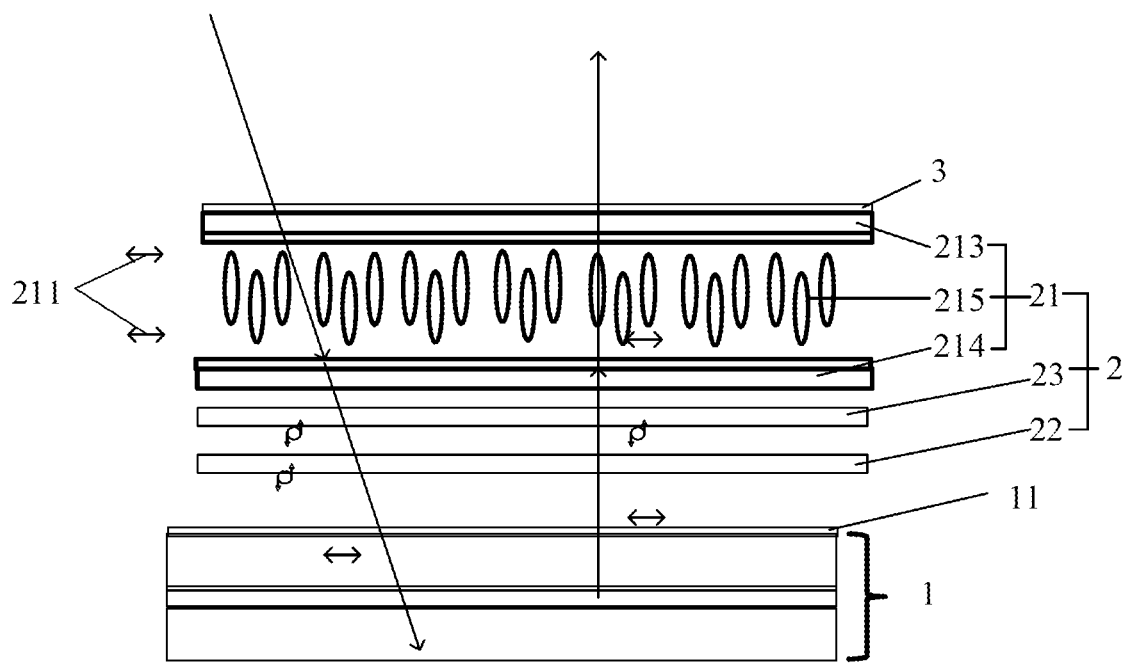
FIG. 2 is a schematic view showing light paths in the first kind of display module provided by the embodiment of the present disclosure in a second state.

In a first aspect, an embodiment of the present disclosure provides a display module. FIG. 1 is a schematic view showing a light path in a first kind of display module provided by an embodiment of the present disclosure in a first state. FIG. 2 is a schematic view showing light paths in the first kind of display module provided by the embodiment of the present disclosure in a second state. As shown in FIG. 1 and FIG. 2, the display module includes: a display component 1 and an anti-dazzle component 2. The anti-dazzle component 2 includes an anti-dazzle module 21, a selective reflecting sheet 22 and a first phase-difference film 23. The selective reflecting sheet 22 is overlaid on a first surface of the display component 1, and the first phase-difference film 23 is arranged between the anti-dazzle module 21 and the selective reflecting sheet 22, wherein a first light-filtering sheet 11 is overlaid on the first surface of the display component 1, the first light-filtering sheet 11 is configured to convert a light emitted by the display component 1 into a linearly-polarized light, the anti-dazzle module 21 is configured to pass through a first polarized light 211 or a second polarized light 212, a polarization vector of the first polarized light 211 is located in a plane formed by an incident light and a corresponding reflected light thereof, and a polarization vector of the second polarized light 212 is perpendicular to a plane formed by an incident light and a corresponding reflected light thereof. A polarization direction of a light reflected by the selective reflecting sheet 22 is the same as that of a light passing through the first phase-difference film 23, and a polarization direction of a light reflected by the selective reflecting sheet 22 is opposite to that of a light passing through the selective reflecting sheet 22.

Among them, the anti-dazzle module 21 is mainly used to transmit the first polarized light 211 or the second polarized light 212, that is, to transmit different lights in different states, and specifically, may transmit the first polarized light 211 or the second polarized light 212. Specifically, as shown in FIG. 1, in a condition that the first polarized light 211 passes through the anti-dazzle module 21, the first polarized light 211 is converted into a circularly-polarized light when passing through the first phase-difference film 23. Taking that the first phase-difference film 23 is a phase-difference film for transmitting a right-handed circularly-polarized light, as an example, when the first polarized light 211 passes through the first phase-difference film 23, the first polarized light 211 is converted into the right-handed circularly-polarized light. Since a polarization direction of a light reflected by the selective reflecting sheet 22 is the same as that of a light passing through the first phase-difference film 23, and a polarization direction of a light reflected by the selective reflecting sheet 22 is opposite to that of a light passing through the selective reflecting sheet 22, the right-handed circularly-polarized light is reflected by the selective reflecting sheet 22, the reflected right-handed circularly-polarized light passes through the first phase-difference film 23 and becomes the first polarized light 211, and the first polarized light 211 may pass through the anti-dazzle module 21 and be emitted out as well, thus realizing a reflection of an ambient light.

As shown in FIG. 2, in a condition that the second polarized light 212 passes through the anti-dazzle module 21, since the polarization vector of the second polarized light 212 is perpendicular to a plane formed by an incident light and a corresponding reflected light thereof, after the light passes through the first phase-difference film 23, the light may pass through the selective reflecting sheet 22, and reach the display component 1 set under a bottom of the selective reflecting sheet 22, thus most of the light is absorbed by the display component 1, so as to realize prevention of dazzle. In this time, a light emitted by the display component 1 passes through the selective reflecting sheet 22 and the first phase-difference film 23, reaches the anti-dazzle module 21, and is finally emitted out through the anti-dazzle module 21, thus realizing a transmission of a display light.

Figure 5:
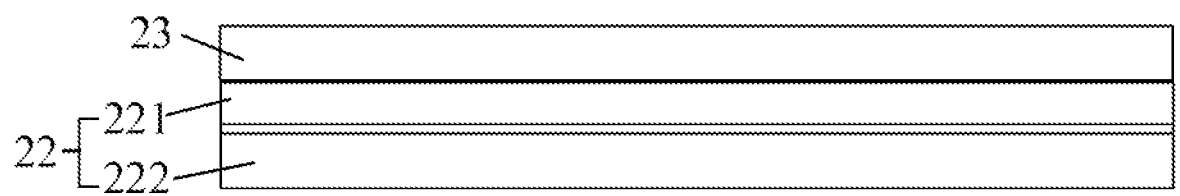
FIG. 5 is a schematic view showing a partial structure of a first kind of anti-dazzle component provided by an embodiment of the present disclosure.
Figure 6:
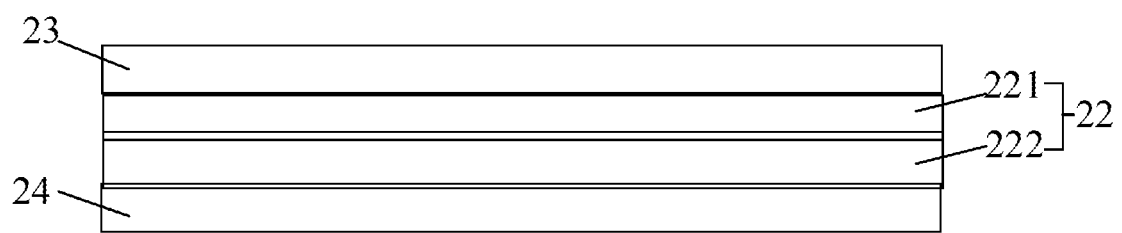
FIG. 6 is a schematic view showing a partial structure of a second kind of anti-dazzle component provided by an embodiment of the present disclosure.
Figure 7:
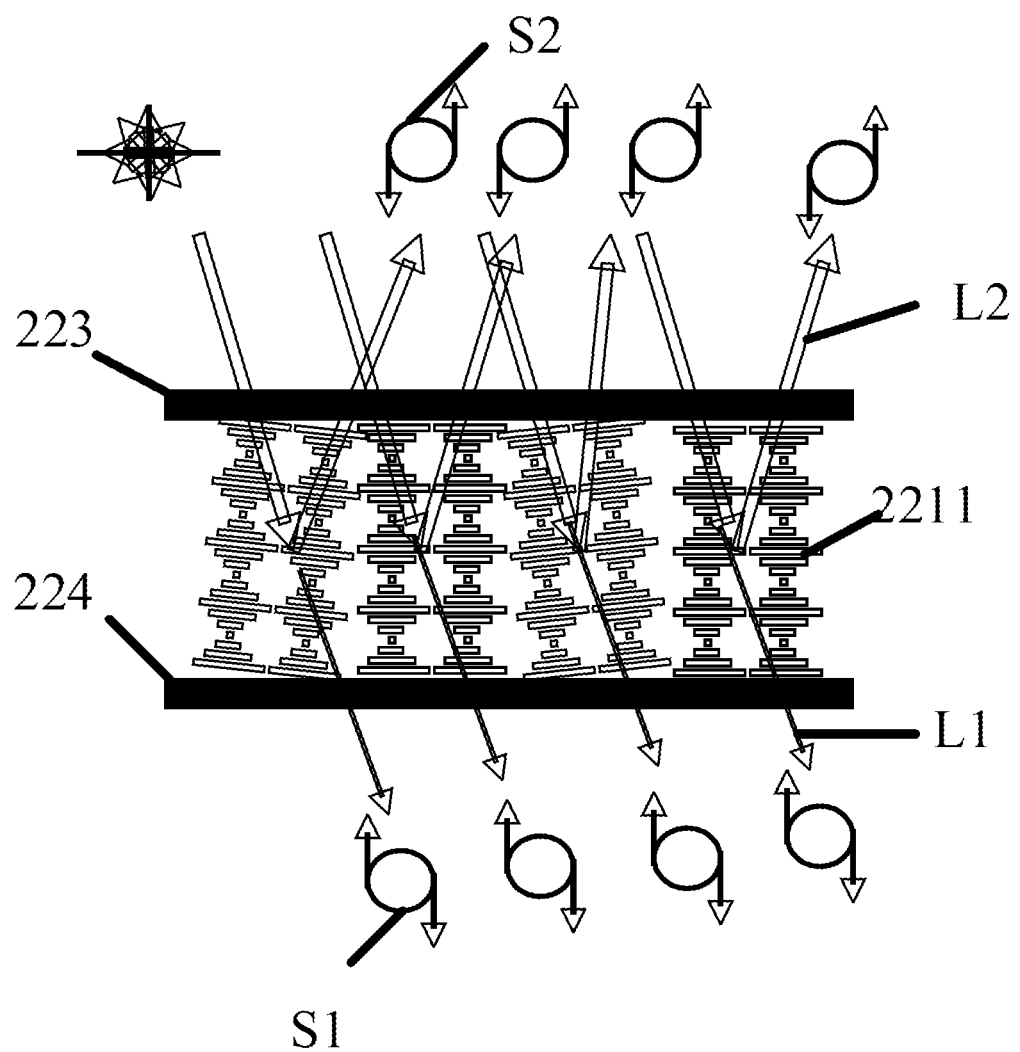
FIG. 7 is a schematic view showing a structure of a selective reflecting sheet provided by an embodiment of the present disclosure.

It should be noted that, as shown in FIGS. 5-7, the selective reflecting sheet 22 is a kind of reflective device being able to select a waveband, which may include a first substrate 223 and a second substrate 224, and a liquid-crystal layer 221 between the first substrate 223 and the second substrate 224. Taking a left-handed liquid-crystal layer 221, as an example, the first substrate 223 and the second substrate are aligned antiparallelly, to realize a plane texture of the liquid-crystal layer 221, and in a state of the texture, the liquid-crystal molecules 2211 in a cholesteric phase in the liquid-crystal layer 221 are arranged in parallel in a plane. However, alignment directions of the liquid-crystal molecules in adjacent planes have slight changes, and change helically along a normal direction of the plane. Such a structure may carry out a part of Bragg refection on an incident light, a corresponding reflected light thereof is a left-handed circularly-polarized light, and the structure may transmit a right-handed circularly-polarized light, such that a selective reflection is realized, that is, the structure may only transmit the right-handed circularly-polarized light and reflect the left-handed circularly-polarized light. Among them, S1 in FIG. 7 represents the right-handed circularly-polarized light, S2 represents the left-handed circularly-polarized light, and the liquid-crystal molecules are left-handed liquid-crystal molecules.

Figure 8:
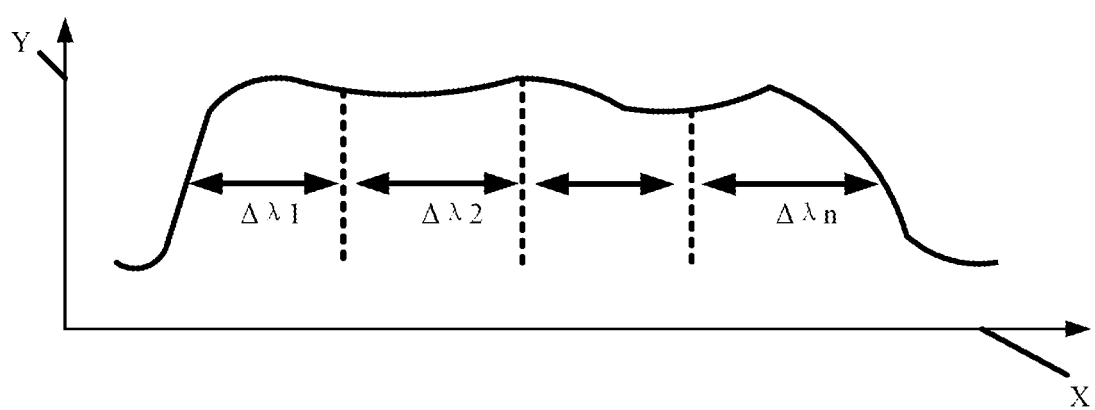
FIG. 8 is a schematic view showing a wavelength-change curve of a selective reflecting sheet provided by an embodiment of the present disclosure.

Further, as shown in FIG. 8, a wavelength $\lambda$ of a light on which the selective reflecting sheet 22 acts, is equal to $\Delta n * p$, wherein $\Delta n$ is a birefringence index of the liquid-crystal molecules, p is a helical pitch of the liquid crystal molecules 2211 in the liquid-crystal layer 221, and the helical pitch is a distance in which the alignment direction thereof changes 360°. It may be concluded that the wavelength $\lambda$ of the selective reflection may be changed by changing the helical pitch p. The helical pitch p may be adjusted by a concentration e of a chiral additives in the liquid crystal, and $p=1/(HTP*c)$, wherein HTP is an inherent distortion-energy constant of the liquid crystal. Among them, the wavelength $\lambda$ of the light on which the selective reflecting sheet 22 acts, is as shown by a X coordinate in FIG. 8, and a reflectance of the light is as shown by a Y coordinate in FIG. 8.

It may be seen from the above embodiments that, in the embodiments of the present disclosure, because the selective reflecting sheet 22 is overlaid on the first surface of the display component 1, and the first phase-difference film 23 is set between the anti-dazzle module 21 and the selective reflecting sheet 22, the light passing through the anti-dazzle module 21 needs to pass through the selective reflecting sheet 22 and the first phase-difference film 23 in sequence. Further because a polarization direction of a light reflected by the selective reflecting sheet 22 is the same as that of a light passing through the first phase-difference film 23, and a polarization direction of a light reflected by the selective reflecting sheet 22 is opposite to that of a light passing through the selective reflecting sheet 22, when the anti-dazzle module 21 transmits the first polarized light 211, the first phase-difference film 23 may convert the first polarized light 211 into a polarized light that may be reflected by the selective reflecting sheet 22, then, after the polarized light re-passes through the first phase-difference film 23, the polarized light becomes the first polarized light 211 once more, which may be emitted out through the anti-dazzle module 21 as well, thus realizing the reflection of the ambient light. When the anti-dazzle module 21 transmits the second polarized light 212, since a polarization vector of the second polarized light 212 is perpendicular to a plane formed by an incident light and a corresponding reflected light thereof, the light may directly pass through the first phase-difference film 23 and the selective reflecting sheet 22, and reach the display component 1 set under the bottom of the selective reflecting sheet 22, thus most of the light is absorbed by the display component 1, so as to realize prevention of dazzle. In this time, the light emitted by the display component 1 passes through the selective reflecting sheet 22 and the first phase-difference film 23, reaches the anti-dazzle module 21, and is finally emitted out through the anti-dazzle module 21, thus realizing the transmission of the display light. To sum up, the display module provided by the embodiments of the present disclosure realizes a selective polarization of light, to realize prevention of dazzle, and at the same time, because only the selective reflecting sheet 22 and the first phase-difference film 23 need to be added between the anti-dazzle module 21 and the display component, a manufacturing process thereof is relatively simple, and no special material is needed, thus reducing a manufacturing cost of the display module.

It should be noted that, in a condition that the second polarized light 212 passes through the anti-dazzle module 21, because the light emitted by the display component 1 directly passes through the selective reflecting sheet 22, display brightness of the display module is reduced.

Based on the above, in the embodiments of the present disclosure, a second phase-difference film 24 is further arranged between the selective reflecting sheet 22 and the first surface of the display component 1, and the second phase-difference film 24 is configured to convert a light into a circularly-polarized light.

Figure 3:
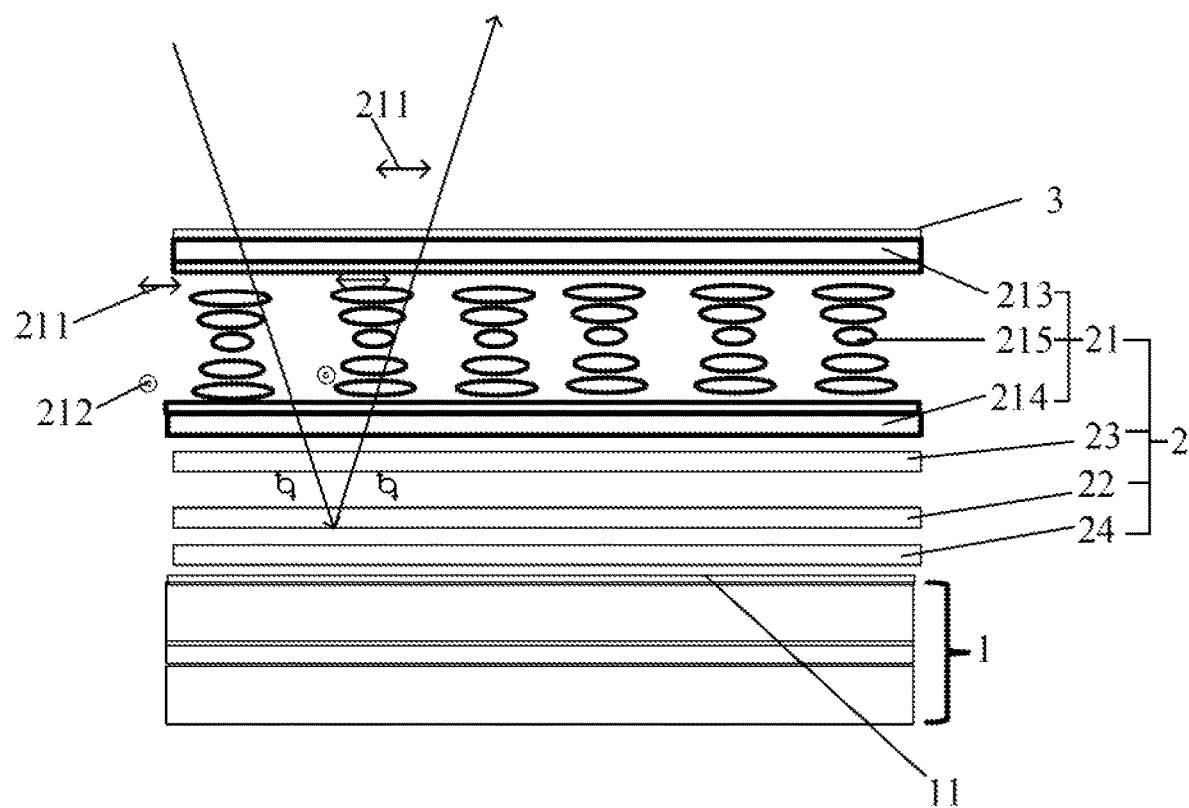
FIG. 3 is a schematic view showing a light path in a second kind of display module provided by an embodiment of the present disclosure in a first state.

It should be noted that, similarly, taking that the first phase-difference film 23 is the phase-difference film for transmitting the right-handed circularly-polarized light, as an example. As shown in FIG. 3, when the first polarized light 211 passes through the first phase-difference film 23, the first polarized light 211 is converted into the right-handed circularly-polarized light. Since a polarization direction of a light reflected by the selective reflecting sheet 22 is the same as that of a light passing through the first phase-difference film 23, and a polarization direction of a light reflected by the selective reflecting sheet 22 is opposite to that of a light passing through the selective reflecting sheet 22, the right-handed circularly-polarized light is reflected by the selective reflecting sheet 22, the reflected right-handed circularly-polarized light passes through the first phase-difference film 23 and becomes the first polarized light 211, and the first polarized light 211 may pass through the anti-dazzle module 21 and be emitted out as well, thus realizing the reflection of the ambient light.

Figure 4:
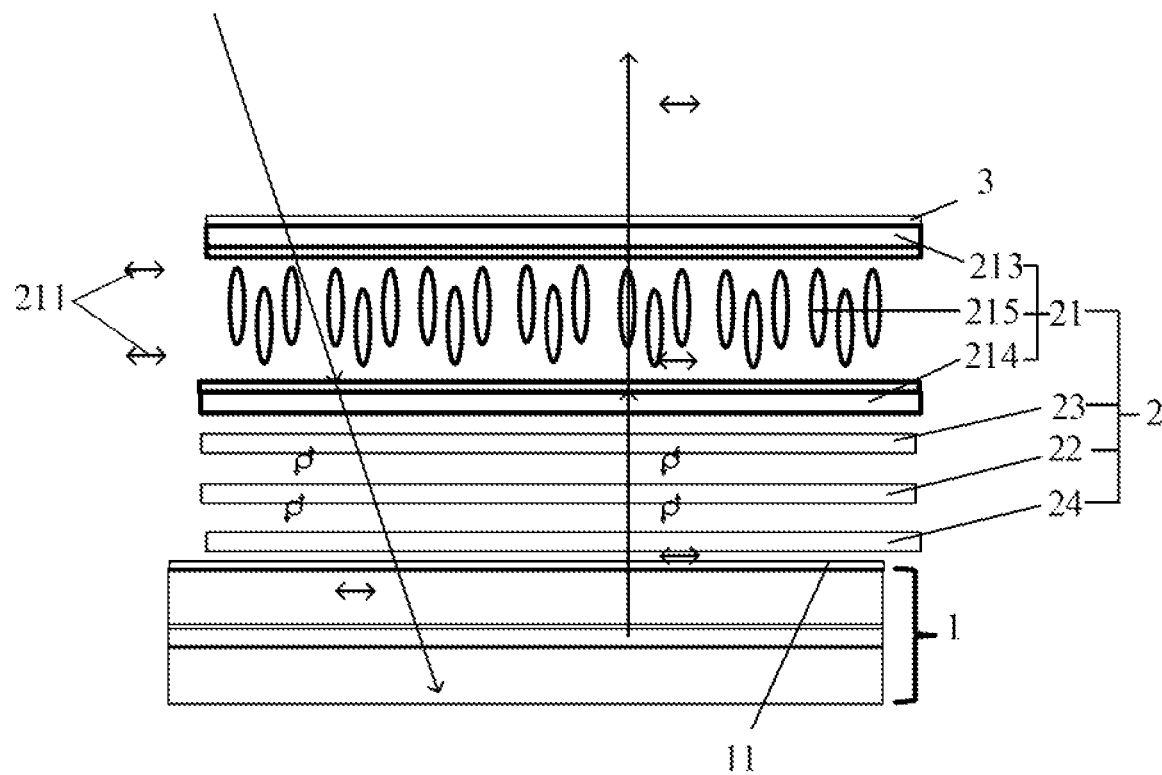
FIG. 4 is a schematic view showing light paths in the second kind of display module provided by the embodiment of the present disclosure in a second state.

As shown in FIG. 4, in a condition that the second polarized light 212 passes through the anti-dazzle module 21, since a polarization vector of the second polarized light 212 is perpendicular to a plane formed by an incident light and a corresponding reflected light thereof, the light may directly pass through the first phase-difference film 23, the selective reflecting sheet 22, and the second phase-difference film 24, and reach the display component 1 set under the bottom of the selective reflecting sheet 22, thus most of the light is absorbed by the display component 1, thus realizing the prevention of dazzle. In this time, the light emitted by the display component 1 passes through the second phase-difference film 24 first, and for example, the light is converted into a left-handed circularly-polarized light. Since a polarization direction of a light reflected by the selective reflecting sheet 22 is the same as that of a light passing through the first phase-difference film 23, and a polarization direction of a light reflected by the selective reflecting sheet 22 is opposite to that of a light passing through the selective reflecting sheet 22, such that all of the light may pass through the selective reflecting sheet 22, then pass through the first phase-difference film 23 and be converted into the display light, and finally be emitted out through the anti-dazzle module 21, thus realizing the transmission of the display light. From the above embodiments, it may be seen that, after the second phase-difference film 24 is further set between the selective reflecting sheet 22 on the first surface of and the display component 1, after the display light emitted by the display component 1 passes through the second phase-difference film 24, all of the display light may pass through the selective reflecting sheet 22, thereby reducing a loss of brightness, which is conducive to improving display effect of the display module.

In a possible implementation, a light passing through the selective reflecting sheet 22 is a right-handed circularly-polarized light, and a light reflected by the selective reflecting sheet 22 is a left-handed circularly-polarized light.

It should be noted that, in a condition that a light passing through the selective reflecting sheet 22 is a right-handed circularly-polarized light, and a light reflected by the selective reflecting sheet 22 is a left-handed circularly-polarized light, such that both a polarization direction of a light passing through the first phase-difference film 23 and a polarization direction of a light reflected by the selective reflecting sheet 22 are a left-handed circularly-polarized light, then, when the first polarized light 211 passes through the anti-dazzle module 21, the first polarized light 211 may pass through, and when the second polarized light 212 passes through the anti-dazzle module 21, the second polarized light 212 may be reflected out.

In another possible implementation, a light passing through the selective reflecting sheet 22 is a left-handed circularly-polarized light, and a light reflected by the selective reflecting sheet 22 is a right-handed circularly-polarized light.

It should be noted that, in a condition that a light passing through the selective reflecting sheet 22 is a left-handed circularly-polarized light, and a light reflected by the selective reflecting sheet 22 is a right-handed circularly-polarized light, such that both a polarization direction of a light passing through the first phase-difference film 23 and a polarization direction of a light reflected by the selective reflecting sheet 22 are a right-handed circularly-polarized light, then, when the second polarized light 212 passes through the anti-dazzle module 21, the second polarized light 212 may pass through as well, and when the first polarized light 211 passes through the anti-dazzle module 21, the first polarized light 211 may be reflected out as well.

In addition, a specific structure of the anti-dazzle module 21 may be as follows: the anti-dazzle module 21 includes a first transparent substrate 213, a second transparent substrate 214 and a liquid-crystal cell 215, the liquid-crystal cell 215 is arranged between the first transparent substrate 213 and the second transparent substrate 214, and the first phase-difference film 23 is overlaid under the second transparent substrate 214. In this way, a polarization direction of a light entering the anti-dazzle module 21 may be controlled by controlling an arrangement direction of the liquid-crystal molecules in the liquid-crystal cell 215, thus realizing a preliminary selection of the polarization direction of the light.

Further, the display module further includes a second light-filtering sheet 3. The second light-filtering sheet 3 is overlaid on the first transparent substrate 213.

It should be noted that the second light-filtering sheet 3 is an optical device for select a radiation band to be needed. In the embodiments of the present disclosure, an ambient light passing through the second light-filtering sheet 3 will be converted into a linearly-polarized light.

Optionally, in a condition that an electric field is formed between the first transparent substrate 213 and the second transparent substrate 214, the liquid-crystal molecules in the liquid-crystal cell 215 are arranged in a second direction, and the linearly-polarized light transmitted from the second light-filtering sheet 3 passes through the liquid-crystal cell 215 to form the second polarized light 212. In a condition that no electric field presents between the first transparent substrate 213 and the second transparent substrate 214, the liquid-crystal molecules in the liquid crystal cell 215 are arranged in a first direction, and the linearly-polarized light transmitted from the second light-filtering sheet 3 passes through the liquid-crystal cell 215 to form the first polarized light 211. Among them, an electric-field direction of the electric field is from the first transparent substrate 213 to the second transparent substrate 214, the second direction is the same as the electric-field direction of the electric field, and the second direction and the first direction are perpendicular to each other.

It should be noted that electricity is applied on entire surfaces of the first transparent substrate 213 and the second transparent substrate 214, to form an electric field from the first transparent substrate 213 to the second transparent substrate 214 between the first transparent substrate 213 and the second transparent substrate 214. In this way, when the linearly-polarized light passing through the second light-filtering sheet 3 enters the liquid crystal cell 215, because the liquid crystal is arranged in the same direction as the electric-field direction of the electric field under an action of the electric field, the liquid-crystal molecules are perpendicular to the electric-field direction of the electric field, in this time, the first polarized light 211 is blocked, and the second polarized light 212 may pass through the anti-dazzle module 21 without changing a light path thereof.

In some embodiments, as shown in FIG. 5 and FIG. 6, the selective reflecting sheet 22 includes the liquid-crystal layer 221 and a polyester resin substrate 222. A first surface of the liquid-crystal layer 221 is overlaid on the polyester resin substrate 222, and a second surface of the liquid crystal layer 221 contacts the first phase-difference film 23. The liquid-crystal molecules in the liquid-crystal layer 221 are a cholesteric liquid crystal. The liquid crystal molecules are arranged in parallel in the liquid-crystal layer 221, and corresponding liquid-crystal molecules of two adjacent layers are arranged in a helical rotation along a direction, wherein the direction is a normal direction of a plane at which the liquid crystal layer 221 is located, which may be the same as the above second direction.

It should be noted that corresponding liquid-crystal molecules of two adjacent layers are arranged in a helical rotation along a normal direction of a plane, and the distance in which the alignment direction thereof changes 360°, is called the helical pitch p. The wavelength $\lambda$ of the selective reflection satisfies $\lambda=\Delta n*p$, wherein $\Delta n$ is the birefringence of the liquid-crystal molecules, and p is the helical pitch of the cholesteric liquid crystal. A size of the helical pitch p may be adjusted by the concentration c of the chiral additives in the liquid crystal, and $p=1/(HTP*c)$, wherein HTP is the inherent distortion-energy constant of the liquid crystal. In this way, by changing the helical pitch p, a polarization direction of a light entering the liquid-crystal layer 221 may be changed, to realize selection of the polarization direction of the light.

In some embodiments, the first phase-difference film 23 is a quarter-wave plate.

It should be noted that, when a light of a certain wavelength is vertically incident through the quarter-wave plate, a phase difference between an emitted ordinary light and an emitted abnormal light, is ¼ wavelength thereof. In a light path, the quarter-wave plate is often used to change a linearly-polarized light into a circularly-polarized light or an elliptically polarized light.

It may be seen from the above embodiments that, in the embodiments of the present disclosure, because the selective reflecting sheet 22 is overlaid on the first surface of the display component 1, and the first phase-difference film 23 is set between the anti-dazzle module 21 and the selective reflecting sheet 22, the light passing through the anti-dazzle module 21 needs to pass through the selective reflecting sheet 22 and the first phase-difference film 23 in sequence. Further because a polarization direction of a light reflected by the selective reflecting sheet 22 is the same as that of a light passing through the first phase-difference film 23, and a polarization direction of a light reflected by the selective reflecting sheet 22 is opposite to that of a light passing through the selective reflecting sheet 22, when the anti-dazzle module 21 transmits the first polarized light 211, the first phase-difference film 23 may convert the first polarized light 211 into a polarized light that may be reflected by the selective reflecting sheet 22, then, after the polarized light re-passes through the first phase-difference film 23, the polarized light becomes the first polarized light 211 once more, which may be emitted out through the anti-dazzle module 21 as well, thus realizing the reflection of the ambient light. When the anti-dazzle module 21 transmits the second polarized light 212, since a polarization vector of the second polarized light 212 is perpendicular to a plane formed by an incident light and a corresponding reflected light thereof, the light may directly pass through the first phase-difference film 23 and the selective reflecting sheet 22, and reach the display component 1 set under the bottom of the selective reflecting sheet 22, thus most of the light is absorbed by the display component 1, thus realizing the prevention of dazzle. In this time, the light emitted by the display component 1 passes through the selective reflecting sheet 22 and the first phase-difference film 23, reaches the anti-dazzle module 21, and is finally emitted out through the anti-dazzle module 21, thus realizing the transmission of the display light. To sum up, the display module provided by the embodiments of the present disclosure realizes the selective polarization of light, to realize the prevention of dazzle, and at the same time, because only the selective reflecting sheet 22 and the first phase-difference film 23 need to be added between the anti-dazzle module 21 and the display component, the manufacturing process thereof is relatively simple, and no special material is needed, thus reducing the manufacturing cost of the display module.

Figure 9:
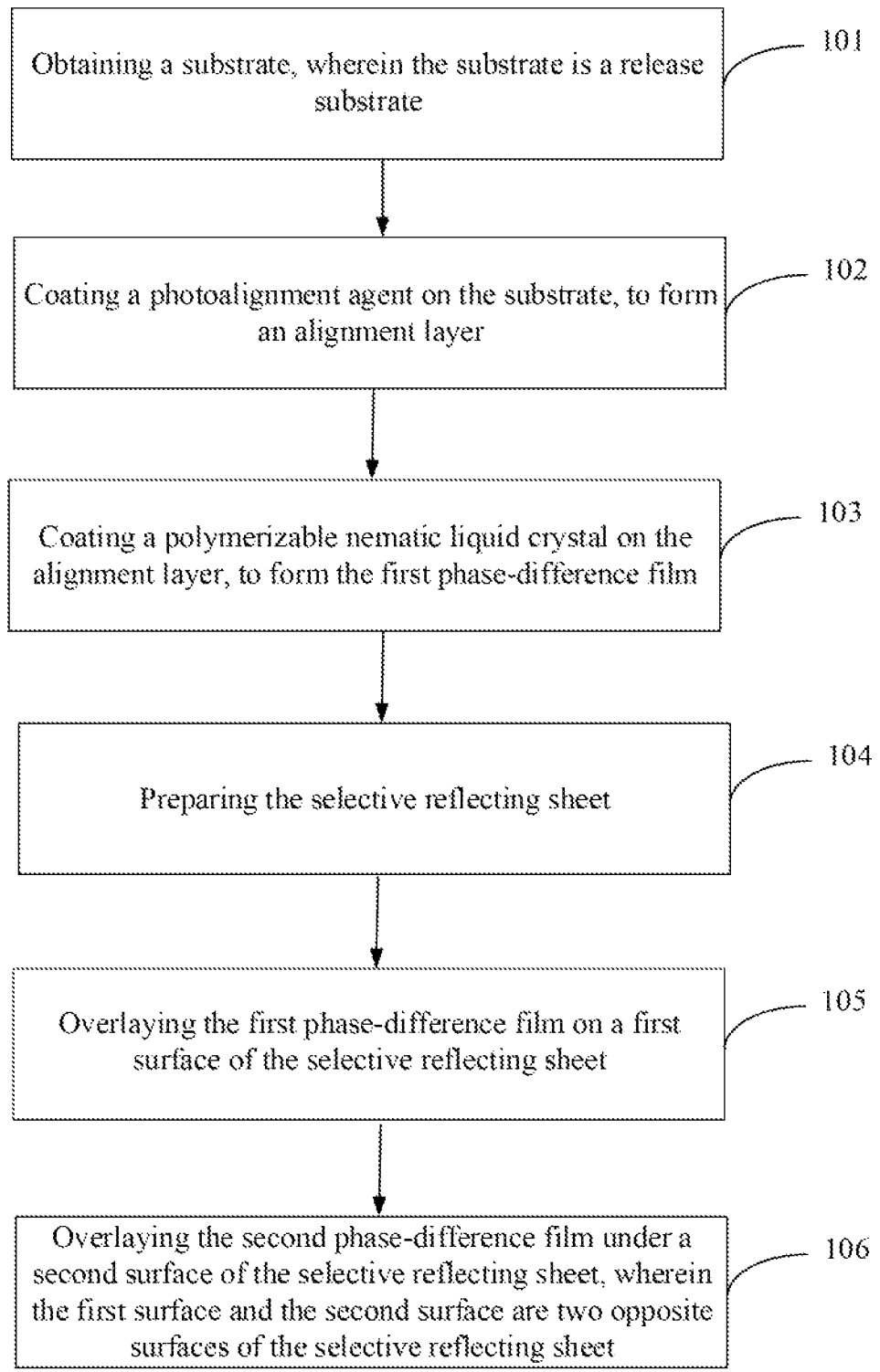
FIG. 9 is a schematic view showing a process flow of a preparation method provided by an embodiment of the present disclosure.

In a second aspect, an embodiment of the present disclosure further provides a preparation method, for preparing the selective reflecting sheet 22 and the first phase-difference film 23 included in the display module of any embodiment in the first aspect. As shown in FIG. 9, the preparation method includes:

Step 101: Obtaining a substrate, wherein the substrate is a release substrate.

It should be noted that the release substrate is a substrate that includes a support carrier and a release layer. The release layer usually includes a material such as polyimide, silane compound, siloxane compound, etc. The support carrier may be glass, metal or silicon wafer.

Step 102: Coating a photoalignment agent on the substrate, to form an alignment layer.

It should be noted that the photoalignment agent may improve performance of array of liquid-crystal, electrical characteristic such as voltage retention, pretilt angle, residual DC (direct-current voltage), etc., printability, cleaning stability and spot stability, and is able to make the liquid crystal unidirectionally align through an ultraviolet-light (UV) irradiation.

Step 103: Coating a polymerizable nematic liquid crystal on the alignment layer, to form the first phase-difference film 23.

It should be noted that the nematic liquid crystal is a liquid crystal in a nematic phase, which is twisted in a natural state. When a voltage is applied to the polymerizable nematic liquid crystal, the polymerizable nematic liquid crystal will be reversely twisted by a corresponding angle according to a magnitude of the applied voltage, thus the polymerizable nematic liquid crystal may be used to control transmission of light, and finally form the first phase-difference film 23. It should further be noted that a thickness of the first phase-difference film 23 may be controlled by drying and the ultraviolet-light radiation, to be such as 1 μm, thus obtaining the first phase-difference film 23.

Step 104: Preparing the selective reflecting sheet 22.

It should be noted that the selective reflecting sheet 22 may include the liquid-crystal layer 221 and the polyester resin substrate 222. the first surface of the liquid-crystal layer 221 is overlaid on the polyester resin substrate 222, and the second surface of the liquid-crystal layer 221 contacts the first phase-difference film 23. The liquid-crystal molecules in the liquid-crystal layer 221 are the cholesteric liquid crystal. The liquid-crystal molecules are arranged in parallel in the liquid-crystal layer 221, and corresponding liquid-crystal molecules of two adjacent layers are arranged in a helical rotation along the above second direction, wherein the above second direction is a normal direction of a plane at which the liquid-crystal layer 221 is located. It should be further noted that corresponding liquid-crystal molecules of two adjacent layers are arranged in a helical rotation along a normal direction of a plane, and the distance in which the alignment direction thereof changes 360°, is called the helical pitch p. The wavelength λ of the selective reflection satisfies λ=Δn*p, wherein Δn is the birefringence of the liquid-crystal molecules, and p is the helical pitch of the cholesteric liquid crystal. A size of the helical pitch p may be adjusted by the concentration c of the chiral additives in the liquid crystal, and p=1/(HTP*c), wherein HTP is the inherent distortion-energy constant of the liquid crystal.

Step 105: Overlaying the first phase-difference film 23 on a first surface of the selective reflecting sheet 22.

It may be seen from the above embodiments that, in the embodiments of the present disclosure, by obtaining the substrate, coating the photoalignment agent on the substrate, forming the alignment layer, coating the polymerizable nematic liquid crystal on the alignment layer, forming the first phase-difference film 23, preparing the selective reflecting sheet 22, and overlaying the first phase-difference film 23 on the first surface of the selective reflecting sheet 22, the first phase-difference film 23 and the selective reflecting sheet 22 may be integrated into the same film layer, which is convenient for processing thereof, and at the same time, is beneficial to save production and manufacturing costs of the display module.

Optionally, in a condition that the display module further includes the second phase-difference film 24, after step 104, the method further includes:

Step 106: Overlaying the second phase-difference film 24 under a second surface of the selective reflecting sheet 22, wherein the first surface and the second surface are two opposite surfaces of the selective reflecting sheet 22.

It should be noted that, in a condition that the display module further includes the second phase-difference film 24, similarly, by the above method, the first phase-difference film 23, the second phase-difference film 24 and the selective reflecting sheet 22 may be integrated into the same film layer, which facilitates processing of the display module, simplifies production and manufacturing process thereof, and saves the production and manufacturing costs of the display module.

Figure 10:
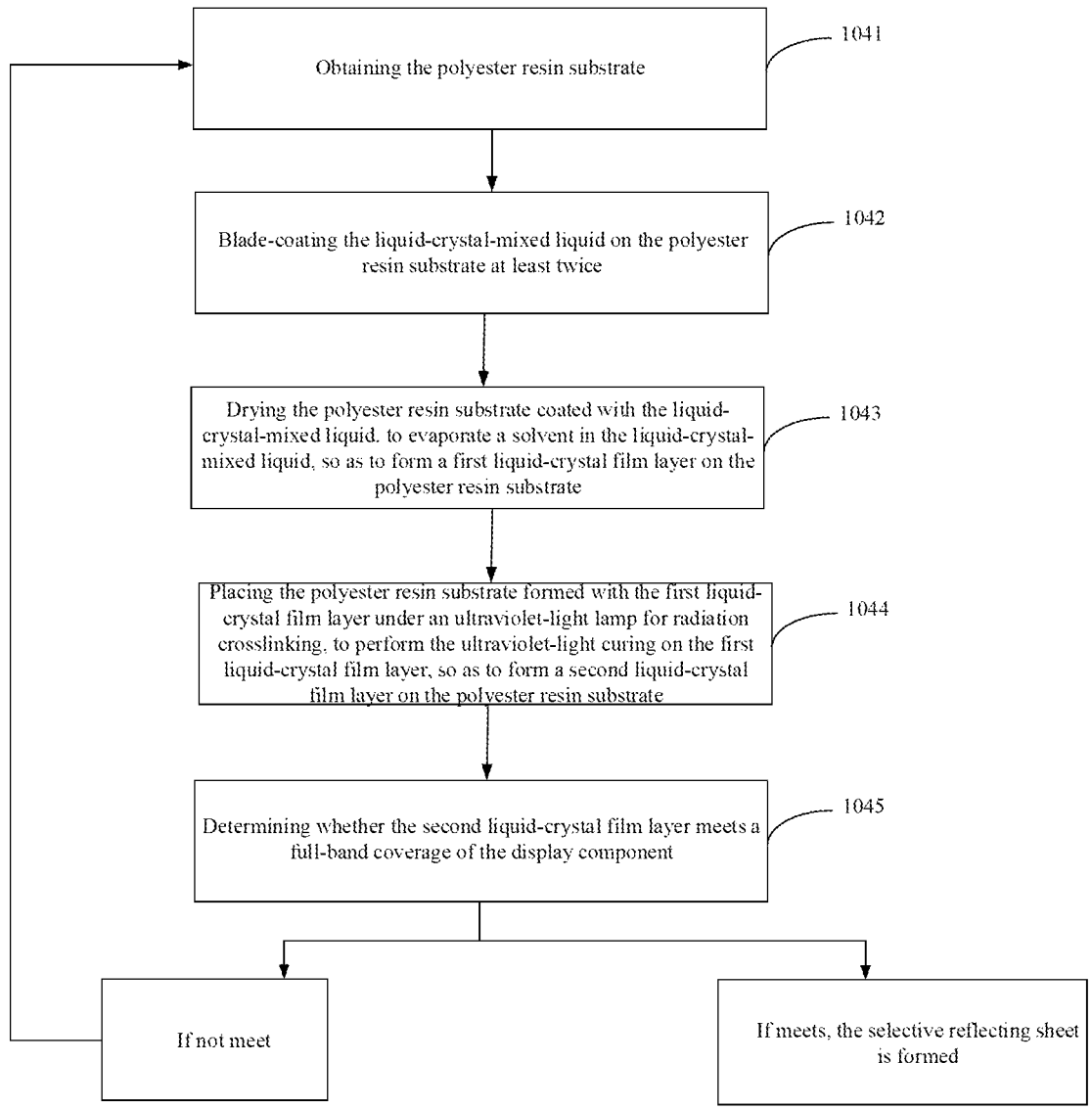
FIG. 10 is a schematic view showing a process flow of another preparation method provided by an embodiment of the present disclosure.

Optional, as shown in FIG. 10, the step 104 includes steps 1041-1045.

Step 1041: Obtaining the polyester resin substrate 222.

It should be noted that, polyester resin has high temperature resistance, and may be used for a long time at a temperature of 120° C., so, by obtaining the polyester resin substrate 222, it is convenient for performing subsequent high-temperature drying and UV curing on a liquid crystal-mixed liquid coated on polyester resin substrate 222.

Step 1042: Blade-coating the liquid-crystal-mixed liquid on the polyester resin substrate 222 at least twice.

It should be noted that a thickness of the blade-coated liquid-crystal-mixed liquid should meet 6 μm. Alternatively, a solid liquid-crystal may be coated on the polyester resin substrate 222 as well, that is, a dry film may be coated on the polyester resin substrate 222, and a thickness of the dry film needs to meet 4 μm. The embodiments of the present disclosure will be illustrated by taking that a wet film is coated on the polyester resin substrate 222, as an example.

Step 1043: Drying the polyester resin substrate 222 coated with the liquid-crystal-mixed liquid, to evaporate a solvent in the liquid-crystal-mixed liquid, so as to form a first liquid-crystal film layer on the polyester resin substrate 222.

It should be noted that, in the above step, the polyester resin substrate 222 coated with the liquid crystal-mixed liquid may be placed in an oven or on a hot table for dying, until the solvent in the liquid crystal-mixed liquid is evaporated, and a drying time is usually 1 min.

Step 1044: Placing the polyester resin substrate 222 formed with the first liquid crystal film layer under an ultraviolet-light lamp for radiation crosslinking, to perform the ultraviolet-light curing on the first liquid-crystal film layer, so as to form a second liquid-crystal film layer on the polyester resin substrate 222.

Figure 11:
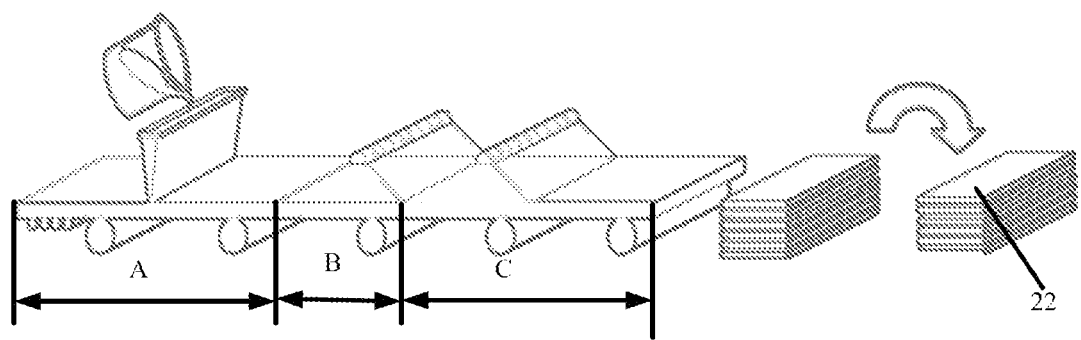
FIG. 11 is a schematic view showing a production line of preparation process of the preparation method provided by an embodiment of the present disclosure.

It should be noted that an ultraviolet light emitted by the ultraviolet-light lamp, from a bottom of the polyester resin substrate 222 to a top thereof, may cure the first liquid-crystal film. An intensity of the ultraviolet light of the ultraviolet-light lamp is about an order of magnitude of 1 mW/cm$^2$ at a position having a distance of 1.5 cm from a lamp tube thereof. A crosslinking time is determined according to an air environment of the Ultraviolet-light lamp. The crosslinking time is 10 min under an air atmosphere, and the crosslinking time is 1 min under a nitrogen atmosphere. When the intensity of the ultraviolet light increases, the crosslinking time may be reduced. For example, in a condition that the intensity of the ultraviolet light is 15 W/cm², the crosslinking time under the air atmosphere may be controlled to be within 10 seconds. It should be further noted that, as shown in FIG. 11, the step 1042 may be completed in a coating area A, the step 1043 may be completed in a drying area B, and the step 1044 may be completed in an ultraviolet-light curing area C, thus forming a complete production line, for batch production of the selective reflecting sheets 22.

Step 1045: Determining whether the second liquid-crystal film layer meets a full-band coverage of the display component 1.

It should be noted that whether the second liquid-crystal film layer meets the full-band coverage of the display component 1 may be tested by a light-measuring device, so as to ensure that the formed selective reflecting sheet 22 is effective for all of respective bands of the display component 1, and prevent a phenomenon such as color deviation, etc.

If the second liquid-crystal film layer meets the full-band coverage of the display component 1, the selective reflecting sheet 22 is formed. If the second liquid-crystal film layer does not meet the full-band coverage of the display component 1, the liquid-crystal-mixed liquid continues being blade-coated on the formed second liquid-crystal film layer, to form the first liquid-crystal film layer, and to further form a subsequent second liquid-crystal film layer, until a finally-formed second liquid-crystal film layer meets the full-band coverage of the display component 1, wherein a finally-formed selective reflecting sheet 22 is a sum of a plurality of the second liquid-crystal film layers.

Optionally, the solvent in the liquid-crystal-mixed liquid is a cyclopentanone solvent.

It should be noted that the cyclopentanone solvent is insoluble in water and soluble in organic solution, therefore, in a condition that the solvent in the liquid-crystal-mixed liquid is the cyclopentanone solvent, it is conducive to a dissolution of the liquid-crystal molecules and prevents water from entering therein. In this condition, it is necessary to ensure that an environment in the step 1042 and step 1043 is an environment having no electricity and no fire, and having no strong oxidant, and in which ventilation is maintained, so as to ensure safety of the production and manufacturing process thereof.

Optionally, the step 1043 may include:

Leaving the polyester resin substrate 222 coated with the liquid-crystal-mixed liquid to stand still, so as to make the liquid-crystal-mixed liquid coated on the polyester resin substrate be in a flat state.

In this way, a flatness of a surface of the first liquid crystal film of a section bar may be guaranteed, and an accuracy for determining whether the subsequent second liquid-crystal film layer meets the full-band coverage of the display component 1, may be improved.

The liquid crystal-mixed liquid in the flat state is dried.

It may be seen from the above embodiments that, in the embodiments of the present disclosure, by obtaining the substrate, coating the photoalignment agent on the substrate, forming the alignment layer, coating the polymerizable nematic liquid crystal on the alignment layer, forming the first phase-difference film 23, preparing the selective reflecting sheet 22, and overlaying the first phase-difference film 23 on the first surface of the selective reflecting sheet 22, the first phase-difference film 23 and the selective reflecting sheet 22 may be integrated into the same film layer, which is convenient for processing thereof, and at the same time, is beneficial to save the production and manufacturing costs of the display module.

In addition, in a process of preparing the selective reflecting sheet 22, the preparation method includes: obtaining the polyester resin substrate 222, blade-coating the liquid-crystal-mixed liquid on the polyester resin substrate 222 at least twice, drying the polyester resin substrate 222 coated with the liquid-crystal-mixed liquid, to evaporate the solvent in the liquid crystal-mixed liquid, so as to form the first liquid crystal film layer on the polyester resin substrate 222, placing the polyester resin substrate 222 formed with the first liquid-crystal film layer under the ultraviolet-light lamp for the radiation crosslinking, to perform the ultraviolet-light curing on the first liquid-crystal film layer, so as to form the second liquid-crystal film layer on the polyester resin substrate 222, and determining whether the second liquid-crystal film layer meets the full-band coverage of the display component 1. If the second liquid-crystal film layer meets the full-band coverage of the display component 1, the selective reflecting sheet 22 is formed. If the second liquid-crystal film layer does not meet the full-band coverage of the display component 1, the liquid-crystal-mixed liquid continues being blade-coated on the formed second liquid-crystal film layer, to form the first liquid-crystal film layer, and to further for a subsequent second liquid crystal film layer, until a finally-formed second liquid-crystal film layer meets the full-band coverage of the display component 1, wherein a finally-formed selective reflecting sheet 22 is the sum of the plurality of second liquid-crystal film layers. In this way, it may be ensured that the formed selective reflecting sheet 22 is effective for all of the respective bands of the display component 1, and prevent the phenomenon such as the color deviation, etc.

It may be seen from the above embodiments that, in the embodiments of the present disclosure, because the selective reflecting sheet is overlaid on the first surface of the display component, and the first phase-difference film is set between the anti-dazzle module and the selective reflecting sheet, the light passing through the anti-dazzle module needs to pass through the selective reflecting sheet and the first phase-difference film in sequence. Further because a polarization direction of a light reflected by the selective reflecting sheet is the same as that of a light passing through the first phase-difference film, and a polarization direction of a light reflected by the selective reflecting sheet is opposite to that of a light passing through the selective reflecting sheet, when the anti-dazzle module transmits the first polarized light, the first phase-difference film may convert the first polarized light into a polarized light that may be reflected by the selective reflecting sheet, then, after the polarized light re-passes through the first phase-difference film, the polarized light becomes the first polarized light once more, which may be emitted out through the anti-dazzle module as well, thus realizing a reflection of the ambient light. When the anti-dazzle module transmits the second polarized light, since a polarization vector of the second polarized light is perpendicular to a plane formed by an incident light and a corresponding reflected light thereof, the light may directly pass through the first phase-difference film and the selective reflecting sheet, and reach the display component set under a bottom of the selective reflecting sheet, thus most of the light is absorbed by the display component. In this time, the light emitted by the display component passes through the selective reflecting sheet and the first phase-difference film, reaches the anti-dazzle module, and is finally emitted out through the anti-dazzle module, thus realizing a transmission of the display light. To sum up, the display module provided by the embodiments of the present disclosure realizes a selective polarization of light, to realize prevention of dazzle, and at the same time, because only the selective reflecting sheet and the first phase-difference film need to be added between the anti-dazzle module and the display component, a manufacturing process thereof is relatively simple, and no special material is needed, thus reducing a manufacturing cost of the display module.

It should be noted that all of the respective embodiments in the specification are described in a progressive manner. The respective embodiments focus on differences from other embodiments. The same and similar parts among the respective embodiments may be referred to each other.

Although optional embodiments of the embodiments of the present disclosure have been described, once those skilled in the art know basic creative concepts thereof, they may make additional changes and modifications to these embodiments. Therefore, the appended claims are intended to be interpreted as including optional embodiments and all changes and modifications falling within the scope of the embodiments of the present disclosure.

Finally, it should be further noted that, in the specification, relational terms such as "a first" and "a second", etc., are only used to distinguish one entity from another entity, and do not necessarily require or imply any such actual relationship or order between these entities. Moreover, terms "including", "includes", or any other variation thereof are intended to cover non-exclusive inclusion, so that an article or a terminal device that includes a series of elements, not only includes those elements, but also includes other elements not explicitly listed, or further includes elements inherent in such article or terminal device. In absence of further restrictions, the element defined by a statement "including a . . . " do not exclude an existence of other identical elements in the article or terminal device that includes the element.

The technical solutions provided by the present disclosure are described in detail as the above. The principle and implementation of the present disclosure are described by using specific examples in the specification. At the same time, the specific implementation and application scope of the present disclosure will be changed according to the principle and implementation of the present disclosure for ordinary skilled in the field. In summary, content of the present specification should not be understood as limitations of the present disclosure.

The invention claimed is:

1. A display module, comprising: a display component and an anti-dazzle component,
   wherein the anti-dazzle component comprises: an anti-dazzle module, a selective reflecting sheet and a first phase-difference film;
   the selective reflecting sheet is overlaid on a first surface of the display component, and the first phase-difference film is arranged between the anti-dazzle module and the selective reflecting sheet, wherein a first light-filtering sheet is overlaid on the first surface of the display component, the first light-filtering sheet is configured to convert a light emitted by the display component into a linearly-polarized light, the anti-dazzle module is configured to pass through a first polarized light or a second polarized light, a polarization vector of the first polarized light is located in a plane formed by an incident light and a corresponding reflected light thereof, and a polarization vector of the second polarized light is perpendicular to a plane formed by an incident light and a corresponding reflected light thereof; and
   a polarization direction of a light reflected by the selective reflecting sheet is the same as that of a light passing through the first phase-difference film, and a polarization direction of a light reflected by the selective reflecting sheet is opposite to that of a light passing through the selective reflecting sheet.

2. The display module according to claim 1, wherein a second phase-difference film is further arranged between the selective reflecting sheet and the first surface of the display component, and the second phase-difference film is configured to convert a light into a circularly-polarized light.

3. The display module according to claim 1, wherein the light passing through the selective reflecting sheet is a right-handed circularly-polarized light, and the light reflected by the selective reflecting sheet is a left-handed circularly-polarized light.

4. The display module according to claim 1, wherein the light passing through the selective reflecting sheet is a left-handed circularly-polarized light, and the light reflected by the selective reflecting sheet is a right-handed circularly-polarized light.

5. The display module according to claim 1, wherein the anti-dazzle module comprises a first transparent substrate, a second transparent substrate and a liquid-crystal cell, and
   the liquid-crystal cell is arranged between the first transparent substrate and the second transparent substrate, and the first phase-difference film is overlaid under the second transparent substrate.

6. The display module according to claim 5, further comprising a second optical light-filtering sheet, and
   the second light-filtering sheet is overlaid on the first transparent substrate, and is configured to convert an ambient light into a linearly-polarized light.

7. The display module according to claim 6, wherein, in a condition that an electric field is formed between the first transparent substrate and the second transparent substrate, liquid-crystal molecules in the liquid-crystal cell are arranged in a second direction, and the linearly-polarized light transmitted from the second light-filtering sheet passes through the liquid-crystal cell, to form the second polarized light,
   in a condition that no electric field presents between the first transparent substrate and the second transparent substrate, the liquid-crystal molecules in the liquid-crystal cell are arranged in a first direction, and the linearly-polarized light transmitted from the second light-filtering sheet passes through the liquid-crystal cell, to form the first polarized light, and
   an electric-field direction of the first electric field is from the first transparent substrate to the second transparent substrate, the second direction is the same as the electric-field direction of the electric field, and the second direction and the first direction are perpendicular to each other.

8. The display module according to claim 1, wherein the selective reflecting sheet comprises a liquid-crystal layer and a polyester resin substrate,
   a first surface of the liquid-crystal layer is overlaid on the polyester resin substrate, and a second surface of the liquid-crystal layer contacts the first phase-difference film, and
   liquid-crystal molecules in the liquid-crystal layer are a cholesteric liquid crystal, the liquid-crystal molecules are arranged in parallel in the liquid crystal layer, and corresponding liquid-crystal molecules of two adjacent layers are arranged in a helical rotation along a direction, wherein the direction is a normal direction of a plane at which the liquid-crystal layer is located.

9. The display module according to claim 1, wherein the first phase-difference film is a quarter-wave plate.

10. A preparation method for preparing the selective reflecting sheet and the first phase-difference film comprised in the display module according to claim 1, wherein the preparation method comprises:
    obtaining a substrate, wherein the substrate is a release substrate;
    coating a photoalignment agent on the substrate, to form an alignment layer;
    coating a polymerizable nematic liquid crystal on the alignment layer, to form the first phase-difference film;
    preparing the selective reflecting sheet; and
    overlaying the first phase-difference film on a first surface of the selective reflecting sheet.

11. The preparation method according to claim 10, wherein the display module further comprises a second phase-difference film, configured to convert a light into a circularly-polarized light, and, after the overlaying the first phase-difference film on the first surface of the selective reflecting sheet, the method further comprises:
    overlaying the second phase-difference film under a second surface of the selective reflecting sheet, wherein the first surface and the first surface are two opposite surfaces of the selective reflecting sheet.

12. The preparation method according to claim 10, wherein the preparing the selective reflecting sheet comprises:
    obtaining a polyester resin substrate;
    blade-coating a liquid-crystal-mixed liquid on the polyester resin substrate at least twice;
    drying the polyester resin substrate coated with the liquid-crystal-mixed liquid, to evaporate a solvent in the liquid-crystal-mixed liquid, so as to form a first liquid-crystal film layer on the polyester resin substrate;
    placing the polyester resin substrate formed with the first liquid-crystal film layer under an ultraviolet-light lamp for radiation crosslinking, to perform ultraviolet-light curing on the first liquid-crystal film layer, so as to form a second liquid-crystal film layer on the polyester resin substrate;
    determining whether the second liquid-crystal film layer meets a full-band coverage of the display component, and
    in response to that the second liquid-crystal film layer does not meet the full-band coverage of the display component, continuing blade-coating the liquid-crystal-mixed liquid on the formed second liquid-crystal film layer, to form the first liquid-crystal film layer, and to further form a subsequent second liquid-crystal film layer, until a finally-formed second liquid-crystal film layer meets the full-band coverage of the display component, wherein a finally-formed selective reflecting sheet is a sum of a plurality of the second liquid-crystal film layers.

13. The preparation method according to claim 12, wherein the solvent in the liquid-crystal-mixed liquid is a cyclopentanone solvent.

14. The preparation method according to claim 12, wherein the drying the polyester resin substrate coated with the liquid crystal-mixed liquid, comprises:
    leaving the polyester resin substrate coated with the liquid-crystal-mixed liquid to stand still, so as to make the liquid-crystal-mixed liquid coated on the polyester resin substrate be in a flat state, and
    drying the liquid-crystal-mixed liquid in the flat state.

* * * * *